United States Patent [19]
Lewis et al.

[11] Patent Number: 5,744,883
[45] Date of Patent: Apr. 28, 1998

[54] CONTOURED SWITCH LEVER FOR CENTRIFUGAL SWITCH

[75] Inventors: William Lewis, Hazelwood; Thomas Ottersbach, Normandy, both of Mo.

[73] Assignee: Emerson Electric Co., St. Louis, Mo.

[21] Appl. No.: 786,263

[22] Filed: Jan. 22, 1997

[51] Int. Cl.⁶ .................... H02P 5/30; H02K 11/00
[52] U.S. Cl. .................... 310/68 E; 310/68 A; 318/793; 200/335; 200/80 R
[58] Field of Search .................... 310/68 E, 68 A; 318/793, 782, 785; 200/80 R, 335

[56] References Cited

U.S. PATENT DOCUMENTS

| | | | |
|---|---|---|---|
| 2,041,161 | 5/1936 | Brown et al. | 172/279 |
| 2,165,858 | 7/1939 | Jepson | 172/36 |
| 2,452,807 | 11/1948 | Thompson | 230/58 |
| 4,240,001 | 12/1980 | Hildebrandt et al. | 310/68 E |
| 4,242,607 | 12/1980 | Hildebrandt et al. | 318/68 E |
| 4,289,988 | 9/1981 | Schaefer | 310/68 E |
| 4,296,366 | 10/1981 | Hildebrandt et al. | 318/793 |
| 4,334,161 | 6/1982 | Carli | 310/68 E |
| 4,336,472 | 6/1982 | Czech | 310/68 E |
| 4,395,668 | 7/1983 | Komatsu | 318/439 |
| 4,473,789 | 9/1984 | Hildebrandt et al. | 318/793 |
| 4,658,196 | 4/1987 | Hildebrandt | 318/793 |
| 5,057,657 | 10/1991 | Skulic | 200/517 |

*Primary Examiner*—Steven L. Stephan
*Assistant Examiner*—Nguyen N. Tran
*Attorney, Agent, or Firm*—Howell & Haferkamp, L.C.

[57] ABSTRACT

A switch lever for use with a centrifugal starting switch of an electric motor. The starting switch has at least one switch contact which is moveable, in response to axial movement of a centrifugal actuator, between a start position in which a starting winding of the motor is energized and a run position in which the starting winding is de-energized. The switch lever of the present invention operatively connects the switch contact with the centrifugal actuator for movement in response thereto. The switch lever has a cam follower at one end which is engageable with an annular actuator collar of the centrifugal actuator. The cam follower includes a contoured rear cam face which prevents the cam follower from becoming "stuck" behind a flat rear surface of the actuator collar during assembly or operation of the motor.

22 Claims, 2 Drawing Sheets

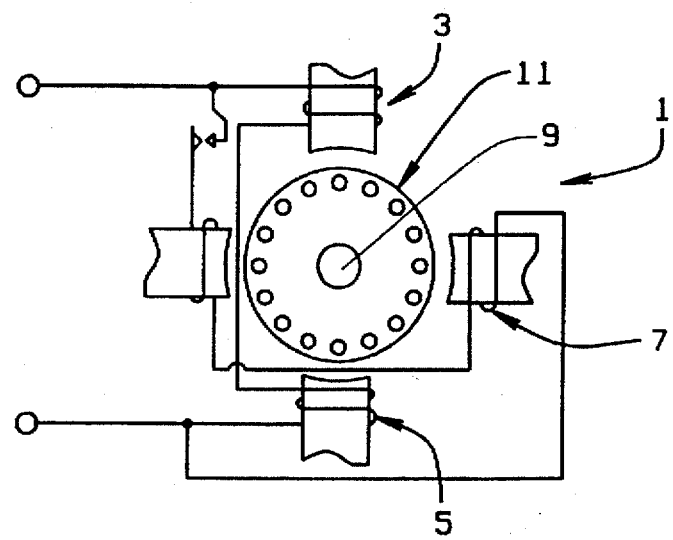
FIG. 1
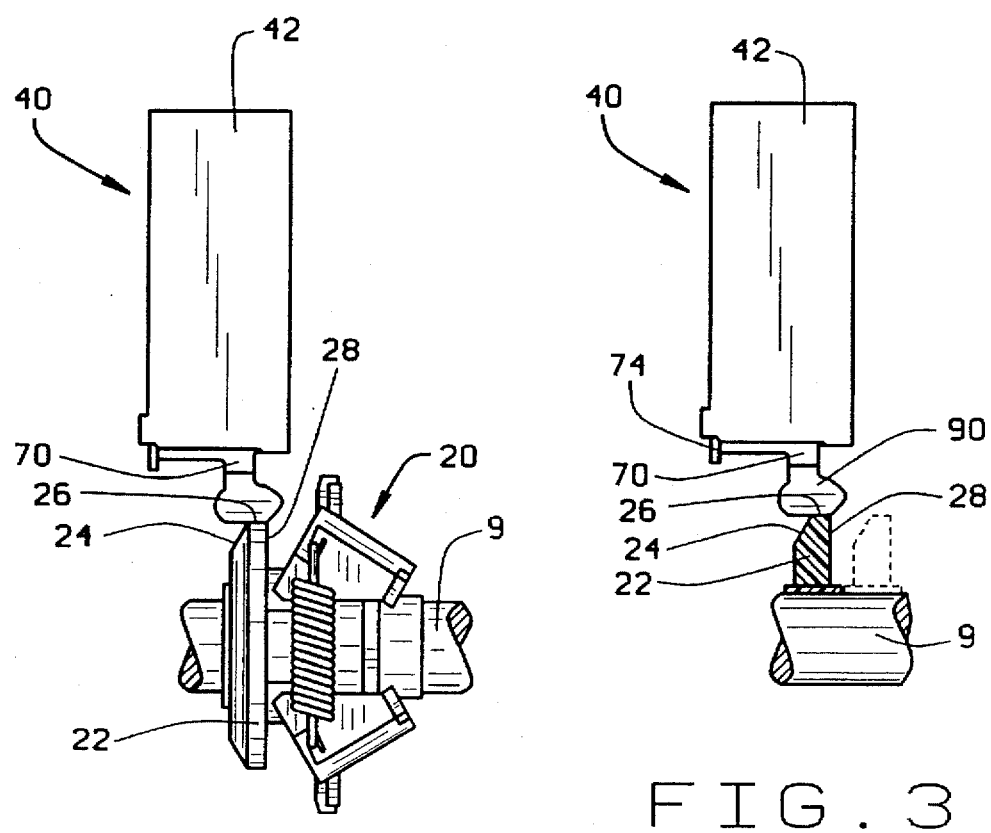
FIG. 2
FIG. 3

CONTOURED SWITCH LEVER FOR CENTRIFUGAL SWITCH

BACKGROUND OF THE INVENTION (1) Field of the Invention

The present invention pertains to a switch for an electric motor. More particularly, the present invention pertains to an actuator linkage for connecting a starting switch of an electric motor to a centrifugal actuator.

(2) Description of the Related Art

Typically, capacitor start and split phase induction motors have a run winding and a starting winding placed in winding receiving slots provided in the bore of the stator core of the motor. The starting winding is energized during start-up of the motor, or when the speed of the motor falls below a specified operating speed, so as to create a rotating field in the stator and to apply sufficient torque to the rotor for starting purposes. However, once the motor has accelerated to a desired operating speed, or a predetermined percentage thereof, the rotor is able to follow the alternations of the magnetic field created by the run windings, and the starting winding is no longer needed.

Usually, the starting winding is not intended for continuous use and may fail if not de-energized during normal operation of the motor. Conventionally, a switch, referred to a motor starting switch, is provided in the motor for energizing the starting winding only during start-up of the motor and for de-energizing the starting winding once the motor has attained its desired operating speed.

These motor starting switches are conventionally actuated by a centrifugal actuator mounted on and rotatable with the rotor shaft of the motor, the centrifugal actuator being responsive to the speed of the motor for actuating the starting switch from its start to its run position in response to the motor attaining a predetermined operating speed. Some prior art centrifugal actuators include an annular actuator collar which is shiftable axially on the rotor shaft from an off or stop position when the motor is stopped (or is operating below a specified operating speed) to a run position upon the motor accelerating to a predetermined operating speed.

Typically, an actuator linkage operatively interconnects the motor starting switch and the annular actuator collar of the centrifugal actuator. Co-assigned U.S. Pat. No. 4,296,366 shows an actuator linkage comprising a pivotable switch lever having a cam follower which is engageable by cam surfaces on the annular actuator collar of the centrifugal actuator as the actuator collar shifts axially along a motor shaft. The switch lever, which is operatively connected to the switch contacts of the starting switch, is therefore pivoted in response to the axial movement of the actuator collar.

The invention shown in the '366 patent was a significant improvement over the prior art in that it provides a motor starting switch which: (i) is operable by a centrifugal actuator requiring a relatively low force for actuation; (ii) is less sensitive to end play than prior art switches; (iii) limits the force that can be applied to the switch contacts to avoid overstressing of the flexible switch arms carrying the contacts; (iv) substantially reduces the entrance of airborne particles into the interior of the switch; and (v) is compact, rugged, reliable, easy to install, and which has a relatively long service life.

However, a problem with the switch lever shown in the '366 patent is that, during assembly or operation of the electric motor, the switch lever sometimes becomes "stuck" behind the annular actuator collar. The actuator collar shown in the '366 patent has a generally conical cam surface, an outer cylindrical cam surface generally coaxial with the axis of rotation of the motor shaft, and a flat rear surface axially opposite the conical cam surface. The cam follower of the switch lever shown in the '366 patent includes an inclined cam face configured for cammingly engaging the conical cam surface of the actuator collar and a bottom cam face configured for cammingly engaging the outer cylindrical cam surface of the actuator collar. However, the rear face of the cam follower, which is opposite the inclined cam face, is flat. Consequently, if the cam follower becomes "stuck" behind the flat rear surface of the actuator collar during assembly or operation of the motor, the flat rear face of the cam follower will be in blunt engagement with the flat rear surface of the actuator collar, thereby preventing the switch lever from moving back into its proper position against the outer cylindrical cam surface of the actuator collar.

Another problem with the switch lever shown in the '366 patent is caused by "end play" which may develop over the service life of the motor. "End play" refers to axial movement of the rotor shaft relative to the end shields or frame of the motor. The invention disclosed in the '366 patent is generally less sensitive to end play than its predecessors. However, end play may still be sufficient so as to appreciably change the relative positions of the centrifugal actuator, which is mounted on the rotor shaft, and the motor starting switch, which may be rigidly mounted on the motor housing or end shield, thus effecting the operation of the motor starting switch. Severe end play may lead to the cam follower of the switch lever becoming stuck behind the actuator collar, as described above. Again, because the flat rear face of the cam follower will be in blunt engagement with the flat rear surface of the actuator collar, the switch lever will be prevented from moving back into its proper position against the outer cylindrical cam surface of the actuator collar.

SUMMARY OF THE INVENTION

It is an object of this invention to prevent the cam follower of the switch lever from becoming stuck behind the actuator collar of the centrifugal actuator, during assembly or operation of the electric motor. It is another object of this invention to prevent the cam follower from becoming stuck behind the actuator collar under severe end play conditions of the motor. Still another object of this invention to provide an inexpensive means for facilitating movement of the cam follower from the rear surface of the actuator collar to the outer cylindrical cam surface, should the cam follower become stuck behind the actuator collar.

Accordingly, the above-described problems encountered by the prior art have been solved by the present invention which provides a switch lever having a cam follower with a contoured rear face, rather than a flat rear surface, opposite the inclined cam face.

The switch lever of the present invention is used in a starting switch of an electric motor. The electric motor includes a stator assembly having a main winding and an auxiliary (or starting) winding. A motor shaft, having a rotor mounted thereon, is journalled for rotation within the stator assembly.

The electric motor also includes a centrifugal actuator mounted on the motor shaft. The centrifugal actuator has an annular actuator collar which is shiftable along the motor shaft between a start and a run position. The actuator collar shifts axially from a start position to a run position in response to the motor obtaining a predetermined speed, and shifts in reverse direction axially along the motor shaft from the run position to the start position upon slowing or stopping of the motor. The annular actuator collar has a generally conical cam surface facing away from the direction of movement of the actuator collar as it moves axially from the start position to the run position. The actuator collar further includes an outer cylindrical cam surface adjacent the conical cam surface and generally coaxial with the axis of rotation of the motor shaft. The actuator collar also has a flat rear surface adjacent the outer cylindrical cam surface and axially opposite the conical cam surface.

The electric motor also includes a starting switch having a housing which is rigidly secured to the motor housing so that its position is fixed relative to the actuator collar. The switch has at least one switch contact within the housing moveable, in response to axial movement of the actuator collar, between a start position in which the auxiliary winding is energized and a run position in which the auxiliary winding is de-energized. The switch contact is operatively connected to the actuator collar by the switch lever of the present invention.

The switch lever has a first end which is pivotally connected to the switch housing and second end which includes a cam follower. The cam follower is in camming engagement with the actuator collar as the actuator collar shifts between its start and run positions along the motor shaft.

The cam follower has an inclined cam face configured for camming engagement with the conical cam surface of the actuator collar. The cam follower also has a bottom cam face which is configured for camming engagement with the outer cylindrical cam surface of the actuator collar. When the actuator collar is in the start position, the bottom face of the cam follower is in camming engagement with the outer cylindrical cam surface. In operation, during starting of the motor, the actuator collar shifts axially from the start position to the run position in response to the motor obtaining a predetermined speed and the cam follower slides off of the outer cylindrical surface and into camming engagement with the conical cam surface. If the motor stops, or slows to a speed below the predetermined speed, the axial collar shifts in reverse direction along the motor shaft from the run position to the start position. When the actuator collar moves along the motor shaft from the run position to the start position, the inclined cam face of the cam follower rides radially outwardly along the conical cam surface and the bottom cam face moves into camming engagement with the outer cylindrical cam surface.

Preferably, the cam follower further includes a contoured rear cam face on the opposite side of the cam follower as the inclined cam face. If the cam follower becomes "stuck" behind the flat rear surface of the actuator collar during assembly or operation of the motor, or due to severe end play of the motor, the contoured rear face of the cam follower will be in engagement with the flat rear surface of the actuator collar. The contoured rear cam face is in camming engagement with at least an outer edge of the flat rear surface of the actuator collar to facilitate movement of the cam follower from the rear surface of the actuator collar to the outer cylindrical cam surface. Specifically, the contoured rear cam face allows the cam follower to ride radially outwardly along the flat rear surface to the outer cylindrical surface.

This movement of the cam follower from the flat rear surface of the actuator collar to the outer cylindrical surface will occur when the actuator collar moves axially from the start position to the run position. However, this movement will also occur even without axial movement of the actuator collar. When the contoured rear cam face engages the flat rear surface of the actuator collar the switch lever is stressed in the axial direction. Consequently, an axial force is generated in the switch lever. The axial force biases the cam follower axially against the rear surface of the actuator collar and causes the contoured rear cam face to ride radially outwardly along the rear surface to the outer cylindrical surface of the actuator collar. The switch lever may also be biased radially inwardly toward the motor shaft due to the switch contacts. However, because this radial bias is rather weak, a switch lever having the contoured surface of the present invention will automatically "pop" back into its proper position (with the bottom cam face of the cam follower in engagement with the outer cylindrical cam surface of the actuator collar) against the radial bias of the switch lever.

In one embodiment of the present invention, the contoured rear cam face of the cam follower has a curved or rounded surface which is convex. In an alternative embodiment, the contoured rear cam face has an inclined surface which is similar to the inclined cam face of the cam follower. In still another embodiment, the rear surface of the actuator collar includes a contoured surface.

While the principal advantages and features of the present invention have been described above, a more complete and thorough understanding and appreciation for the invention may be attained by referring to the drawings and description of the preferred embodiment which follow.

BRIEF DESCRIPTION OF THE DRAWINGS

FIG. 1 is a schematic view of a typical split phase induction motor illustrating the arrangement of the main winding and auxiliary windings of the stator assembly of the motor and the connection of the motor starting switch to the auxiliary windings of the motor;

FIG. 2 is a side elevational view of a motor starting switch including the contoured switch lever of the present invention and illustrating a portion of the motor shaft on which is mounted a centrifugal actuator operable to effect actuation of the starting switch between its starting and run positions;

FIG. 3 is a vertical longitudinal cross-sectional view of a motor starting switch including the switch lever of the present invention and a portion of the centrifugal actuator with the switch lever and the centrifugal actuator shown in a starting position (the location of the centrifugal actuator when in the run position is shown in dotted lines);

DETAILED DESCRIPTION OF THE PREFERRED EMBODIMENT

Figure 4:
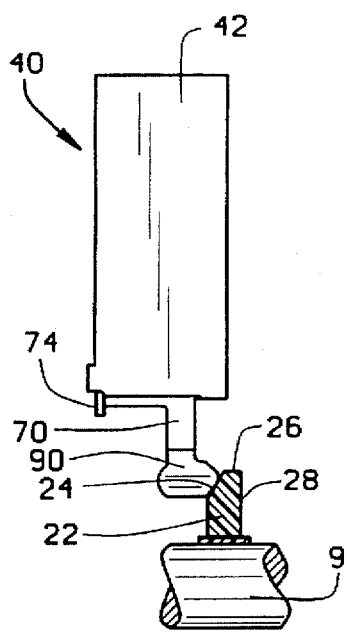
FIG. 4 is a vertical longitudinal cross-sectional view of a motor starting switch including a switch lever of the present invention and a portion of the centrifugal actuator with the switch lever and the centrifugal actuator shown in the run position.

The switch lever of the present invention is used in a starting switch of an electric motor, such as a split phase fractional horsepower induction motor. As shown schematically in FIG. 1, the electric motor 1 includes a stator assembly 3 having a main winding 5 and an auxiliary (or starting) winding 7. A motor shaft 9, having a rotor 11 mounted thereon, is journalled for rotation within the stator assembly 3.

As shown in FIG. 2, the electric motor also includes a centrifugal actuator 20 mounted on the motor shaft 9. The centrifugal actuator 20 has an annular actuator collar 22 which is shiftable axially along the motor shaft 9 between start and run positions. The actuator collar 22 shifts from the start position to the run position in response to the motor 1 obtaining a predetermined speed, and shifts in reverse direction axially along the motor shaft 9 from the run position to the start position upon slowing or stopping of the motor 1. FIG. 3 shows a partial sectional view of the actuator collar 22 in the start position. Also in FIG. 3, the actuator collar is shown in the run position in dotted lines. FIG. 4 shows the actuator collar 22 in the run position.

The annular actuator collar 22 has a generally conical cam surface 24 facing away from the direction of movement of the actuator collar 22 as it moves axially from the start position to the run position. The actuator collar 22 further includes an outer cylindrical cam surface 26 adjacent the conical cam surface 24 and generally coaxial with the axis of rotation of the motor shaft 9. The actuator collar 22 also has a flat rear surface 28 adjacent the outer cylindrical cam surface 26 and axially opposite the conical cam surface 24.

Figure 5:
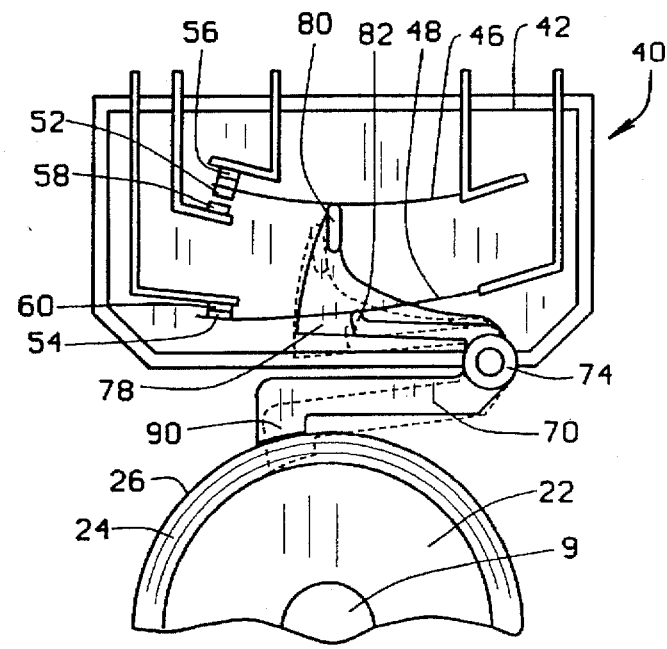
FIG. 5 is an enlarged front elevational view of a motor starting switch including the switch lever of the present invention with the cover of the starting switch removed (the switch is shown in its starting position in solid lines and in its run position in dotted lines)

The electric motor 1 also includes a starting switch 40 having a switch housing 42 which is rigidly secured to the motor housing (not shown) so that its position is fixed relative to the actuator collar 22. As shown in FIG. 5, the starting switch 40 has a pair of flexible switch arms 46, 48 within the switch housing 42. The flexible switch arms 46, 48 carry moveable electrical contacts 52, 54 on their free ends which cooperate with fixed contacts 56, 58, and 60.

The flexible switch arms 46, 48 are preferably made of a resilient, electrically conductive material and are moveable within the switch housing 42, in response to axial movement of the actuator collar 22, between a start position in which the auxiliary winding 7 is energized and a run position in which the auxiliary winding 7 is de-energized. In the start position, the moveable contacts 52, 54 engage the fixed contacts 56 and 60, thereby completing a circuit which energizes the auxiliary winding 7. In the run position, the moveable contacts 52, 54 disengage the fixed contacts 56 and 60 and the moveable contact 52 engages the fixed contact 58, thereby de-energizing the auxiliary winding 7. As will be described further, the flexible switch arms 46, 48 are operatively connected to the annular actuator collar 22 by the switch lever of the present invention.

Co-assigned U.S. Pat. No. 4,296,366, referenced above, shows a pivotable starting switch lever having a cam follower which is engageable by an annular actuator collar of a centrifugal actuator as the actuator collar shifts axially along a motor shaft. It will be understood that the disclosure of this co-assigned patent, as it applies to the switch lever of the present invention, is incorporated herein by reference and should be referred to for a more complete disclosure of the starting switch 40, the centrifugal actuator 20, and their operational interrelationship.

Figure 6:
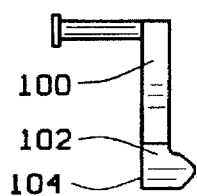
FIG. 6 is a front elevational view of a prior art switch lever.
Figure 9:
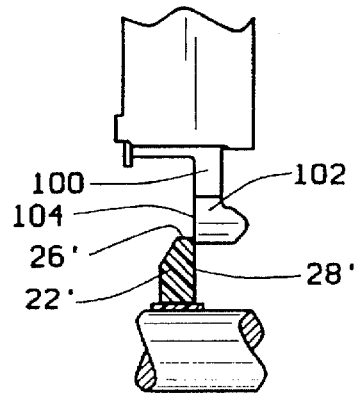
FIG. 9 is a vertical longitudinal cross-sectional view of a motor starting switch including a prior art switch lever shown with the switch lever caught behind the rear surface of the centrifugal actuator.

FIG. 6 shows a prior art switch lever 100 with a cam follower 102 having a flat rear face 104. The prior art switch lever 100 is shown in FIG. 9 to be "stuck" behind the annular actuator collar 22' with the flat rear face 104 of the cam follower 102 in blunt engagement with the flat rear surface 28' of the actuator collar 221. The prior art lever 100 is therefore prevented from moving, against the radial bias of switch lever, back into its proper position engaging the outer cylindrical cam surface 261 of the actuator collar 22'.

The switch lever of the present invention, shown generally as 70, is pivotally mounted to the switch housing 42 and is engageable by the actuator collar 22 as the actuator collar shifts axially between its run and start positions. The switch lever 70 is pivotally mounted to the switch housing 42 by a hub 74. As shown in FIG. 5, the switch lever 70 extends from the bottom of the hub 74 and is disposed outside the switch housing 42. The switch lever 70 includes a cam follower 90 at its free end. As will be explained further below, the cam follower 90 is in camming engagement with the actuator collar 22 as the actuator collar shifts between its start and run positions along the motor shaft 9.

An actuator lever 78 extends from the upper side of the hub 74 and is disposed within the switch housing 42. Preferably, the hub 74, the switch lever 70, and the actuator lever 78 are integrally formed from a unitary piece of substantially rigid plastic which is pivotable relative to the switch housing 42. Therefore, when the switch lever 70 pivots, in response to axial movement of the actuator collar 22, between its run and start positions, the actuator lever 78 pivots similarly within the switch housing 42. The actuator lever 78 engages the flexible switch arms 46, 48 so as to effect movement of the switch arms. The flexible switch arms 46, 48 tend to resiliently bias the actuator lever 78 and the switch lever 70 to pivot toward the actuator collar 22. The actuator lever 78 is provided with integral fingers 80, 82 which slidingly engage and flex the flexible switch arms 46, 48 upwardly as the switch lever 70 and the actuator lever 78 pivot together from the run position to the start position in response to axial shifting of the actuator collar 22.

The cam follower 90 has an inclined cam face 92 configured for camming engagement with the conical cam surface 24 of the actuator collar 22. When the actuator collar 22 moves axially along the motor shaft 9 from the run position to the start position, the inclined cam face 92 of the cam follower 90 engages the conical cam surface 24 and rides outwardly along the conical cam surface 24 toward the outer cylindrical cam surface 26.

The cam follower 90 also has a bottom cam face 94 which is configured for camming engagement with the outer cylindrical cam surface 26 of the actuator collar 22. When the actuator collar 22 moves from the run position back to the start position, the cam follower 90 slides outwardly off of the conical cam surface 24 and into engagement with the outer cylindrical surface 26 of the actuator collar 22.

Figures 7, 8:
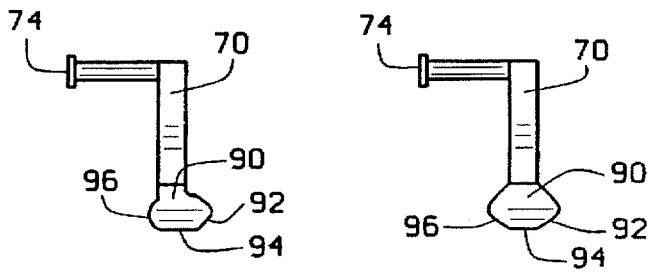
FIG. 7 is a front elevational view of a first embodiment of the switch lever of the present invention.
FIG. 8 is a front elevational view of a second embodiment of the switch lever of the present invention.
Figure 10:
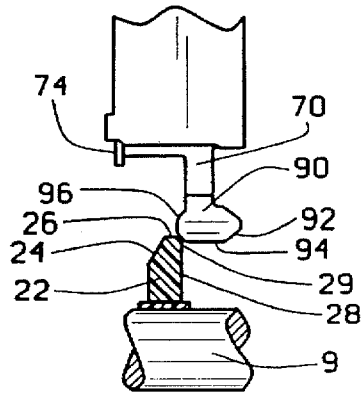
FIG. 10 is a vertical longitudinal cross-sectional view of a motor starting switch including the switch lever of the present invention shown with the switch lever caught behind the rear surface of the centrifugal actuator.

As best shown in FIGS. 7, 8 and 10, the cam follower 90 preferably includes a contoured rear cam face 96 opposite the inclined cam face 92. If the cam follower 90 becomes "stuck" behind the flat rear surface 28 of the actuator collar 22 during assembly or operation of the motor, or due to severe end play of the motor, the contoured rear face 96 of the cam follower 90 will be in engagement with the flat rear surface 28 of the actuator collar 22. As shown in FIG. 10, the contoured rear cam face 96 engages at least an outer edge 29 of the flat rear surface 28 of the actuator collar 22 to facilitate movement of the cam follower 90 from the rear surface 28 of the actuator collar 22 to the outer cylindrical cam surface 26. Specifically, the contoured rear cam face 96 allows the cam follower 90 to ride radially outwardly along the flat rear surface 28 to the outer cylindrical surface 26.

It should be understood that the formative "contoured," as it used throughout the specification and claims in describing the rear cam face 96 of the cam follower 90, refers to any surface configuration of the rear cam face 96 other than a flat surface.

The movement of the cam follower 90 from the flat rear surface 28 of the actuator collar 22 to the outer cylindrical surface 26 will occur when the actuator collar 22 moves axially from the start position to the run position. However, this movement will also occur even without axial movement of the actuator collar 22. If the cam follower 90 gets "stuck" behind the flat rear surface 28 of the actuator collar 22, with the contoured rear cam face 96 engaging the flat rear surface 28, the switch lever 70 is stressed. Consequently, a moment is generated in the switch lever 70. The moment biases the cam follower 90 against the rear surface 28 of the actuator collar 22 and causes the contoured rear cam face 96 to cam across the rotating rear surface 28, or at least the outer edge 29 thereof, and ride radially outwardly along the rear surface 28 to the outer cylindrical surface 26 of the actuator collar 22.

As described above, the switch lever 70 is also biased radially inwardly by the flexible switch arms 46, 48. However, because this radial bias is rather weak, a switch lever having the contoured rear cam face 96 of the present invention will automatically "pop" back into its proper position (with the bottom cam face 94 of the cam follower 90 in engagement with the outer cylindrical cam surface 26 of the actuator collar 22) against the radial bias of the switch lever.

FIG. 7 shows one embodiment of the present invention wherein the contoured rear cam face 96 of the cam follower 90 has a curved or rounded surface 98 which is convex. FIG. 8 shows an alternative embodiment wherein the contoured rear cam face 96 has an inclined surface 99 which is similar to the inclined cam face 92 of the cam follower 90. Both of these variant embodiments function in the same manner as the previously described embodiment.

In another embodiment, the rear surface 28 of the actuator collar 22 includes a contoured surface which facilitates movement of the cam follower 90 from the rear surface 28 to the outer cylindrical surface 26 of the actuator collar 22. The contoured surface of the rear surface 28 may be a curved or rounded surface which is convex, an inclined surface, or another equivalent surface which would perform substantially the same function. In this embodiment, the rear cam face of the cam follower may or may not also be contoured. It should be understood that the formative "contoured," as it used to describe the rear surface 28 of the actuator collar 22 in this embodiment, refers to any surface configuration of the rear surface 28, other than a flat surface, which would facilitate movement of the cam follower 90 from the rear surface 28 to the outer cylindrical surface 26 of the actuator collar 22.

While the present invention has been described by reference to specific embodiments for the switch lever, it should be understood that other contoured configurations (other than a flat surface) of the rear cam face would function in the same way to achieve to same result. And although the present invention has been described by reference to a particular use, it should be also understood that different uses of the invention may be made, without departing from the scope of the invention as set forth in the following claims.

What is claimed is:

1. A switch lever for use in a switch of an electric motor, wherein the motor includes a motor shaft having an axis of rotation and a centrifugal actuator mounted on the shaft, the centrifugal actuator having an actuator collar which is axially moveable along the motor shaft between a first position and a second position, the actuator collar having a generally conical cam surface facing away from the direction of movement of the actuator collar as it moves from the first position to the second position, an outer cylindrical cam surface generally coaxial with the axis of rotation of the motor shaft, and a rear surface, the switch having a housing adapted to be secured in a fixed position relative to the actuator collar, the switch lever comprising:

(a) a body having a first end and a second end, the first end of said body being pivotally connected to the switch housing; and (b) a cam follower at the second end of said body, said cam follower being cammingly engageable with the actuator collar as the actuator collar moves between the first and second positions along the motor shaft, said cam follower comprising:

(i) an inclined cam face configured for cammingly engaging the conical cam surface of the actuator collar as the actuator collar moves along the motor shaft from the second position to the first position;

(ii) a bottom cam face configured for cammingly engaging the outer cylindrical cam surface of the actuator collar when the actuator collar is substantially in the first position; and (iii) a contoured rear cam face opposite the inclined cam face configured for camming engagement with at least an outer edge of the rear surface of the actuator collar.

2. The switch lever of claim 1 wherein the contoured rear cam face of said cam follower has a configuration that causes the rear cam face to ride radially outwardly along the rear surface to the outer cylindrical surface as the actuator collar moves from the first position to the second position when the rear cam face engages the rear surface of the actuator collar.

3. The switch lever of claim 1 wherein the switch lever has a configuration that causes a moment to be created in the switch lever, the moment biasing said cam follower against the rear surface of the actuator collar when the contoured rear cam face of said cam follower engages the rear surface of the actuator collar, the contoured rear cam face having a configuration that causes the rear cam face to ride radially outwardly along the rear surface to the outer cylindrical surface of the actuator collar in response to the moment.

4. The switch lever of claim 1 wherein the contoured rear cam face of said cam follower has a curved surface.

5. The switch lever of claim 4 wherein the curved surface is a rounded surface which is convex.

6. The switch lever of claim 1 wherein the contoured rear cam face of said cam follower has an inclined surface.

7. A starting switch for use in an electric motor, wherein the motor includes an auxiliary winding, a motor shaft having an axis of rotation, and a centrifugal actuator mounted on the motor shaft, the centrifugal actuator having an actuator collar which is axially shiftable along the motor shaft from a first position to a second position in response to the motor obtaining a predetermined speed and shiftable in reverse direction along the motor shaft from the second position to the first position upon slowing of the motor below the predetermined speed or stopping of the motor, the actuator collar having a generally conical cam surface facing away from the direction of movement of the actuator collar as it moves from the first position to the second position, an outer cylindrical cam surface generally coaxial with the axis of rotation of the motor shaft, and a rear surface, the starting switch comprising:

(a) a housing adapted to be secured in a fixed position relative to the actuator collar;

(b) at least one switch contact within the housing moveable in response to axial movement of the actuator collar between a start position in which the auxiliary winding is energized and a run position in which the auxiliary winding is de-energized; and (c) a switch lever having a first end and a second end, the first end being pivotally connected to the switch housing, the second end having a cam follower which is in camming engagement with the actuator collar as the actuator collar shifts between the first and second positions along the motor shaft, the cam follower comprising:

(i) an inclined cam face configured for camming engagement with the conical cam surface of the actuator collar as the actuator collar shifts along the motor shaft from the second position to the first position;

(ii) a bottom cam face configured for camming engagement with the outer cylindrical cam surface of the actuator collar when the actuator collar is substantially in the first position; and (iii) a contoured rear cam face opposite the inclined cam face configured for camming engagement with at least an outer edge of the rear surface of the actuator collar.

8. The starting switch of claim 7 wherein the contoured rear cam face of said cam follower has a configuration that causes the rear cam face to ride radially outwardly along the rear surface to the outer cylindrical surface in response to the actuator collar shifting from the first position to the second position when the rear cam face engages the rear surface of the actuator collar.

9. The starting switch of claim 7 wherein the switch lever has a configuration that causes a moment to be created in the switch lever, the moment biasing said cam follower against the rear surface of the actuator collar when the contoured rear cam face of said cam follower engages the rear surface of the actuator collar, the contoured rear cam face having a configuration that causes the rear cam face to follow the rear surface radially outwardly to the outer cylindrical surface of the actuator collar in response to the moment.

10. The starting switch of claim 7 wherein the contoured rear cam face of said cam follower has a rounded surface which is convex.

11. The starting switch of claim 7 wherein the contoured rear cam face of said cam follower is inclined relative to the bottom cam face.

12. An electric motor comprising:

(a) a stator assembly having a main winding and an auxiliary winding;

(b) a motor shaft journalled for rotation within the stator assembly, said motor shaft having an axis of rotation;

(c) a centrifugal actuator mounted on said motor shaft, said centrifugal actuator having an actuator collar which is axially shiftable along said motor shaft from a first position to a second position in response to the motor obtaining a predetermined speed and shiftable in reverse direction along said motor shaft from the second position to the first position upon slowing of the motor below the predetermined speed or stopping of the motor, the actuator collar having a generally conical cam surface facing away from the direction of movement of the actuator collar as it moves from the first position to the second position, an outer cylindrical cam surface generally coaxial with the axis of rotation of the motor shaft, and a rear surface; and (d) a starting switch including a housing adapted to be secured in a fixed position relative to the actuator collar, at least one switch contact within the housing moveable in response to axial movement of the actuator collar between a start position in which the auxiliary winding is energized and a run position in which the auxiliary winding is de-energized, and a switch lever having a first end and a second end, the first end of the switch lever being pivotally connected to the switch housing, the second end of the switch lever having a cam follower which is in camming engagement with the actuator collar as the actuator collar shifts between the first and second positions along said motor shaft, the cam follower comprising:

(i) an inclined cam face configured for camming engagement with the conical cam surface of the actuator collar as the actuator collar shifts along said motor shaft from the second position to the first position;

(ii) a bottom cam face configured for camming engagement with the outer cylindrical cam surface of the actuator collar when the actuator collar is substantially in the first position; and (iii) a contoured rear cam face opposite the inclined cam face configured for camming engagement with at least an outer edge of the rear surface of the actuator collar.

13. The electric motor of claim 12 wherein the contoured rear cam face of said cam follower has a configuration that causes the rear cam face to ride radially outwardly along the rear surface to the outer cylindrical surface in response to axial shifting of the actuator collar when the rear cam face engages the rear surface of the actuator collar.

14. The electric motor of claim 12 wherein the switch lever has a configuration that causes a moment to be created in the switch lever, the moment biasing said cam follower against the rear surface of the actuator collar when the contoured rear cam face of said cam follower engages the rear surface of the actuator collar, the contoured rear cam face having a configuration that causes the rear cam face to ride radially outwardly along the rear surface to the outer cylindrical surface of the actuator collar in response to the moment.

15. The electric motor switch of claim 12 wherein the contoured rear cam face of said cam follower has a rounded surface which is convex.

16. The electric motor of claim 12 wherein the contoured rear cam face of said cam follower includes an inclined surface which is angled toward the bottom cam face.

17. A switch lever for use in a switch of an electric motor, wherein the motor includes a motor shaft having an axis of rotation and a centrifugal actuator mounted on the shaft, the centrifugal actuator having an actuator collar which is axially shiftable along the motor shaft between a first position and a second position, the actuator collar having a generally conical cam surface facing away from the direction of movement of the actuator collar as it moves from the first position to the second position, an outer cylindrical cam surface generally coaxial with the axis of rotation of the motor shaft, and a flat rear surface, the switch having a housing adapted to be secured in a fixed position relative to the actuator collar, the switch lever comprising:

(a) a body having a first end and a second end, the first end of said body being pivotally connected to the switch housing; and (b) a cam follower at the second end of said body, said cam follower being in camming engagement with the actuator collar as the actuator collar shifts between the first and second positions along the motor shaft, said cam follower comprising:

(i) an inclined cam face configured for camming engagement with the conical cam surface of the actuator collar as the actuator collar shifts along the motor shaft from the second position to the first position;

(ii) a bottom cam face configured for camming engagement with the outer cylindrical cam surface of the actuator collar when the actuator collar is substantially in the first position;

(iii) a rear cam face opposite the inclined cam face; and (iv) means provided on the rear cam face for engaging at least an outer edge of the rear surface of the actuator collar to facilitate movement of the cam follower from the rear surface of the actuator collar to the outer cylindrical cam surface.

18. The switch lever of claim 17 wherein the means for engaging at least an outer edge of the rear surface of the actuator collar includes a contoured surface.

19. The switch lever of claim 18 wherein the contoured surface is a rounded surface which is convex.

20. The switch lever of claim 18 wherein the contoured surface is an inclined surface.

21. A switch lever for use in a switch of an electric motor, wherein the motor includes a motor shaft having an axis of rotation and a centrifugal actuator mounted on the shaft, the centrifugal actuator having an actuator collar which is axially moveable relative to the motor shaft between a first position and a second position, the actuator collar having a first switch engaging surface, an outer cam surface, and a rear surface, the switch lever comprising:

a body with a cam follower, said cam follower being cammingly engageable with the actuator collar as the actuator collar moves relative to the motor shaft, said cam follower comprising:

(i) a first cam face configured for cammingly engaging the first switch engaging surface of the actuator collar as the actuator collar moves relative to the motor shaft;

(ii) a rear cam face opposite the first cam face having a contoured surface configured to cause the rear cam face to ride radially along the rear surface of the actuator collar when the rear cam face engages the rear surface of the actuator collar as the actuator collar moves relative to the motor shaft.

22. A switch lever for use in a switch of an electric motor, wherein the motor includes a motor shaft having a centrifugal actuator mounted on the shaft, the centrifugal actuator having an actuator collar which is axially moveable relative to the motor shaft and which includes a first switch engaging surface, an outer surface, and a rear surface, the switch lever comprising:

a body having a cam follower, said cam follower being cammingly engageable with the actuator collar as the actuator collar moves relative to the motor shaft, said cam follower including a rear cam face configured for camming engagement with the rear surface of the actuator collar;

at least one of the rear cam face and the rear surface of the actuator collar having a contoured surface configured to cause the rear cam face to ride radially along the rear surface when the rear cam face engages the rear surface of the actuator collar as the actuator collar moves relative to the motor shaft.

* * * * *